United States Patent [19]
Jensen

[11] Patent Number: 5,269,835
[45] Date of Patent: Dec. 14, 1993

[54] BAGHOUSE FLOATER PURGE SYSTEM

[76] Inventor: Robert M. Jensen, 922 N. Chalet Ave., Tucson, Ariz. 85748

[21] Appl. No.: 959,669

[22] Filed: Oct. 13, 1992

[51] Int. Cl.$^5$ .............................................. B01D 46/04
[52] U.S. Cl. ........................................ 95/279; 55/302; 55/341.1; 55/341.2
[58] Field of Search ............. 55/96, 97, 293, 302-304, 55/341.1, 341.2, 341.3, 341.4

[56] References Cited

U.S. PATENT DOCUMENTS

| | | | |
|---|---|---|---|
| 3,095,289 | 6/1963 | Egan | 55/293 |
| 3,256,679 | 6/1966 | Snyder | 55/96 X |
| 3,325,979 | 6/1967 | Smith | 55/96 X |
| 3,396,516 | 8/1968 | Ballard | 55/302 |
| 3,486,309 | 12/1969 | Wild | 55/302 X |
| 3,612,616 | 10/1971 | Stewart | 55/302 X |
| 3,716,971 | 2/1973 | Reinauer | 55/96 |
| 3,803,807 | 4/1974 | Mills | 55/96 |
| 4,082,523 | 4/1978 | Pausch | 55/293 |
| 4,306,888 | 12/1981 | Cheng | 55/96 |
| 4,507,130 | 3/1985 | Roth | 55/96 |
| 4,648,889 | 3/1987 | Jensen | 55/341.1 |
| 4,692,173 | 9/1987 | Roos | 55/96 |
| 4,731,100 | 3/1988 | Loeffelmann et al. | 55/96 |
| 5,167,676 | 12/1992 | Nakaishi et al. | 55/302 X |

Primary Examiner—Robert Spitzer
Attorney, Agent, or Firm—J. Michael McClanahan

[57] ABSTRACT

Apparatus and method for purging floaters in top inlet baghouse construction wherein the upper plenum of a baghouse compartment and the clean exhaust gases duct are operably connected with a purge duct, a controllable purge damper inserted therein. At termination of the usual cleaning operation, clean exhaust gases are introduced into the top plenum by opening of the controllable purge damper to purge floaters from the upper plenum and down through the bag filters and out the bottom plenum to the reverse air duct. At the termination of the floater purge cycle, the purge damper is closed and the compartment returned to on-line operation. In alternate embodiments, a bottom inlet baghouse construction is purged of floaters wherein clean exhaust gases are given entrance into the upper portion of the bag filters with a controllable purge damper interposed. One embodiment connects with the clean exhaust duct and the other embodiment opens to the filter plenum. At termination of the usual cleaning operation, clean exhaust gases are introduced into the upper portion of the bag filters by opening the controllable purge damper. Then the purge damper is closed and the compartment returned to on-line operation.

21 Claims, 4 Drawing Sheets

BAGHOUSE FLOATER PURGE SYSTEM

BACKGROUND OF THE INVENTION

1. Field of the Invention

The field of the invention is baghouse filtering systems for filtering particulates from the flue exhaust of large scale producers of smokestack emissions.

2. Description of the Related Art

In the realm of methods and means for removing particulate matter from the flue exhaust of large scale producers of emissions, such as utility power plants and the like, extensive research and money has gone into providing various types of apparatus and equipment to accomplish this task. In this respect, construction of so called "baghouses" situated in the flue line intermediate the power plant boiler or furnace and the smokestack has evolved wherein are contained rather large numbers of long (thirty to forty-five feet or so), cylindrical (eight to twelve inches in diameter) bag filters through whose cylindrical walls must pass the gases of the flue exhaust of the coal or oil burning furnace or other process on their trip to the smokestack. These bag filters have spaced apart anti-collapse circumferential rings sewed into their sides to generally maintain a round tube.

The bag filters are usually oriented vertically and in one common application, the flue exhaust is directed to the interior of the cylindrical bags whereupon the gases of the flue exhaust pass through the woven cloth material of the bags leaving the solid particulate matter behind and interiorly to the bags.

The baghouse is divided into a number of sealed compartments, each compartment containing a relatively large number of bag filters, in the range of one hundred to six hundred individual bags. The compartments of the baghouse are arranged so as to be in parallel with each other in the flue exhaust line, i.e., the flue exhaust line from the power plant boiler is manifolded into the inlets of all compartments, and the outlets of the compartments are manifolded back into the exhaust gases line leading to the smokestack. In each compartment, a hopper resides at the bottom to contain the particulate matter which falls out of the flue exhaust and which is collected by the bag filters.

In the development of baghouse construction, several primary methods of filtering have evolved. The most common is the bottom inlet configuration wherein the flue exhaust from the power plant boiler is introduced into the bottom opening of vertically oriented bag filters, the exhaust gases with particulates rising interiorly in the bag filter with the gases of the flue exhaust passing horizontally through the cylindrical sides of the filter where the gas is collected and moved on to the smokestack. To accomplish this, the bottom ends of the bag filters are attached to what is termed the lower or bottom tubesheet situated in the lower region of a compartment, the tubesheet being a rather large flat surface plate which engages the walls of the compartment in a sealed manner, the tubesheet having a number of round perforations therethrough. The bottom of each bag filter engages one of the round perforations also in a sealed manner. The bags are suspended from near the top of the baghouse by means of a round plate whose circumference mates with the top of the bag filter. The round plate has a centrally located eye bolt which attaches to one end of a spring, the other end of the spring fastened to supports below the roof of the baghouse. By such means, the bag filter is suspended under tension. Below the lower tubesheet is the hopper portion of the compartment, the hopper holding the particulate matter for removal, a lower plenum being formed between the bottom tubesheet and the hopper. A filter plenum is similarly formed with the walls of the compartment above the lower tubesheet, the bag filters residing in this plenum.

The flue exhaust is introduced into this lower plenum whereupon the flue exhaust and particulate matter rise vertically in the bag filter with gases passing through the bag filter walls into the filter plenum. The filtered gases are drawn from the filter plenum to the smokestack.

The second method of baghouse filtering is the top inlet method where in configuration, in addition to the bottom tubesheet and hopper, an upper or top tubesheet is added in the upper portion of the compartment, the upper tubesheet being similar in construction to the lower tubesheet, i.e., engaging the walls of the compartment in a sealed manner and having a plurality of round openings therethrough. Just as apparent, an upper or top plenum is formed between the top surface of the upper tubesheet, and the walls and roof of the compartment. Each bag filter is now configured to join an opening of the top tubesheet in a sealed manner as they do the openings of the bottom tubesheet. Consequently, the filter plenum surrounding the sides of the bag filters is now defined by both the lower and upper tubesheet and walls of the compartment, the filter plenum situated between the top plenum and the bottom plenum.

In the top inlet configuration, the flue exhaust from the power plant boiler is introduced into the top plenum above the upper tubesheet in order that the flue exhaust proceed downward through the individual bag filters. The smaller particulate matter is trapped by the woven material cylindrical sides of the bag filter as the gases of the flue exhaust pass horizontally through the filters. The exhaust gases are collected in the filter plenum between the lower and the upper tubesheet and moved on to the smokestack.

In both configurations of baghouse construction, a sufficient number of compartments to receive the flue exhaust from a given power plant are available to place the smokestack emissions in regulatory compliance. In addition, there are one, or in some designs, two more additional compartments. These extra compartments serve to allow for any one of the compartments to be off-line for any reason, (such as maintenance) and for any other compartment to be off-line while it is being cleaned. The extra compartment for cleaning off-line is always included; the maintenance compartment is optional. Cleaning of a compartment is required so that the collected particulate matter on the inside surface of the bag filter may be removed to the hopper below. Different methods for cleaning each of the bag filters is available, such as reversing the gas direction so that clean gases from the filtered flue exhaust obtained from the filter plenum of other on-line compartments enters the filter plenum surrounding the outside walls of the bag filters. In such a case, the "reverse air" gases deform the bag filters about the spaced apart anti-collapse circumferential rings and by doing so dislocate the particulate matter or cake (build-up of particulate matter on the inside of the bag filter) off of the bag material.

The particulates which exist in a baghouse may range in size from rather large particulates of one hundred micrometers in diameter or so (resulting, for example, from burning eastern high sulfur coal) to particulates which are fractions of a micrometer in diameter. The very small sub-micrometer particulates do not fall naturally out of the non-moving flue exhaust in the time span during which the flue exhaust is in the baghouse.

Conventional reverse air cleaning cycles include one or more "null periods" which are short duration periods when there is no flow in either direction through the bags. Null periods are intended to allow time for the dislodged cake to fall to the hopper under that compartment. In addition to any null periods that may be included earlier in the cleaning cycle there will always be a final null period between the moment when reverse flow stops and the moment when forward flow starts. In a typical cleaning cycle the duration of the final null period is usually on the order of 30 to 40 seconds.

During this final null period, just prior to returning to service, the bags and the upper part of the hopper will contain astronomical populations of extremely small particles that will either settle very slowly or will float. The particles that are large enough to settle will move downward so slowly that the fastest settlers will require minutes to reach the hopper and the slowest will require months to reach the hopper. The smallest particles, those smaller than a micrometer, will not settle; they will float and move about in Brownian movement just like dust particles in a beam of light. The too-slow settling particles together with the floating particles are referred to in this description as "floaters".

It is a well established principle in filtration that pressure loss increases as particle size decreases. If the floaters are not removed prior to returning the bags to service after reverse air cleaning they will return to the bags and comprise a layer of extremely small particles in the filter cake. When a group of bags is returned to service after reverse air cleaning the pressure differential between the clean side and the dirty side of the bags is known in the art as the "residual pressure loss". Although the contribution of the layer of floaters to the residual pressure loss has not been determined it can be determined experimentally and can be expected to be a significant component of the residual pressure loss.

In the literature there are reports of residual pressure losses for this type of baghouse on the order of 1.5 to 2.0 inches of water column gauge ("wg). There are also reports of residual loss in the 5 to 7" wg range. Purging the floaters may provide a small (less then 1" wg) reduction for applications that achieve the low end of residual loss and can be expected to provide a large (greater than 1" wg) reduction in residual pressure loss for many applications.

The subject patent however, presents an improvement to top inlet systems of baghouse construction in a means and method by which floaters which have not been trapped may be purged. An alternate embodiment applies the concepts embodied in the invention to the more common bottom inlet baghouse construction.

SUMMARY OF THE INVENTION

The present invention provides a means and method for purging floaters from a top inlet baghouse construction in addition to the normal and usual cleaning method and apparatus of introducing clean exhaust gases into the filter plenum. In the method of the invention, the cleaning mode is divided into two steps, the first step being the usual method of cleaning by bringing clean exhaust gases into the filter plenum surrounding the sides of the elongated bag filters to cause the bag filters to deform, resulting in the accumulated cake breaking up and falling off. The second step entails introducing the clean exhaust gases into the top or upper plenum to purge the floaters therefrom down through the centers of the bag filters into the hopper and out the gas outlet.

In an alternate embodiment of the invention applied to bottom inlet baghouse construction, floaters remaining in the upper portions of the bag filters are purged from the bag filters by introduction of clean exhaust gases through the top round plates securing the top peripheral edge of the bag filters whereupon floaters are carried out the bottom of the bag filters and out the connecting inlet duct into the flue exhaust system.

To implement the invention in the top inlet baghouse configuration, connecting duct means are added to permit open communication between the upper or top plenum of the compartment and the clean gas exhaust, a controllable damper situated in the connecting duct. The damper is kept closed for on-line operation and the first step of the cleaning mode, however, at the end of the first step, the damper is opened to allow clean exhaust gases to enter the top plenum for the final purge of floaters.

In the bottom inlet baghouse system, connecting ducts provide communication through the top round plates securing the tops of the bag filters and the clean exhaust duct, also with a controllable damper therebetween. Here again, the cleaning mode is divided into a two step operation, the first step the normal and usual cleaning method, but on the second step of the cleaning mode, the closed damper is opened allowing the clean exhaust gases to enter into the top of the bag filters, purging floaters to the bottom of the compartment and out.

Accordingly, a primary objective of the present invention is to provide means and methods of completely purging floaters from a top inlet baghouse construction.

Another objective of subject invention is to implement the primary objective through means of connecting duct and a controllable damper by which a final purge of floaters may be accomplished at the end of the normal cleaning operation.

It is another object of a subject invention to provide means and methods for purging floaters from bottom inlet baghouse construction by the implementation of a connecting duct between the upper portion of the sealed off bag filter and a source of clean exhaust gases, a controllable damper in the connecting duct utilized to initiate and terminate the entrance of clean exhaust gases for the final purging operation after the regular cleaning.

The above stated objects as well as other objects which, although not specifically stated, are intended to be included with the scope of the present invention. The invention accordingly comprises the apparatus and method possessing the construction, combination of elements, and arrangement of parts which are exemplified in the following detailed disclosure and the scope of the Application which will be indicated in the claims.

BRIEF DESCRIPTION OF THE DRAWINGS

For further understanding of the features and objects of the subject invention, reference should be had to the following detailed description taking in connection with the accompanying drawings wherein.

In various views, like index numbers refer to like elements.

DETAILED DESCRIPTION OF THE PREFERRED EMBODIMENT

Figure 1:
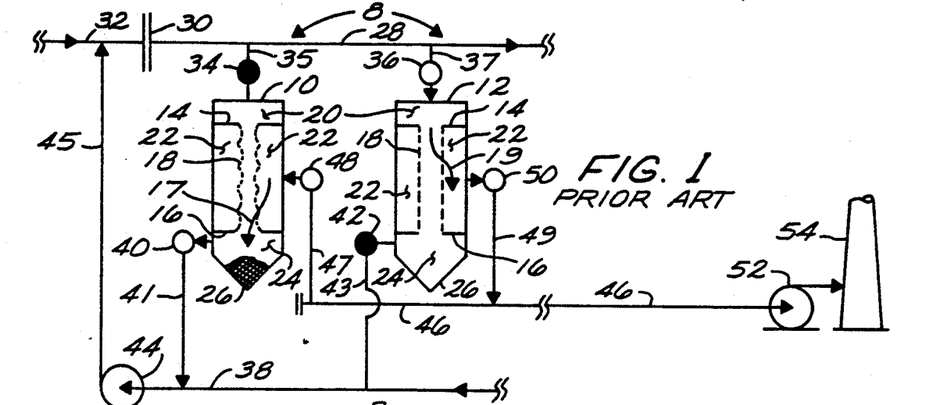
FIG. 1 is a schematic block diagram of the prior art showing top inlet baghouse construction.

Referring now to FIG. 1, conventional top inlet baghouse 8 with standard reverse air system is shown in block diagram form. For ease of illustration, two compartments of a baghouse are illustrated, typically compartments 10 and 12. As indicated earlier, there may be eight to ten compartments, more or less, in a single baghouse. The compartments are identical in construction having the elements as shown in FIG. 1, namely top tubesheet 14, bottom tubesheet 16, and elongated cylindrical bag filter 18. Since the bag filters range between eight and twelve inches in diameter, the openings in the tubesheet accommodating the bag filters will also be in and about the same diameter. Usually an annular thimble is utilized to mate the bag filter to the tubesheet opening. As mentioned earlier, in any one compartment, there may be as many as 700 bag filters, depending upon the design of the installation. The upper and lower tubesheets usually are rectangular in shape having sides in lengths adequate to achieve the requiste area, taking into account necessary spacing between openings. It is common in baghouse construction to sutuate the bag filters and openings throughout the tubesheet in a "3-bag reach" configuration, i.e., the bag filters are arranged in long rows with walkways between rows so that from any one walkway the farthest bag filter is no more than three bag filters away. This is similar to the arrangement of seats that one finds in the very large jet aircraft wherein no seat is placed more than three seats from an aisle.

Naturally, in the top inlet configuration, access to the individual bag filters by walkways will only be in the central filter plenum although in the top plenum above the top tubesheet, there are walkways which permit observation of the openings and thimbles to which the bag filters are attached. In the top plenum, the walkways parallel the walkways in the central filter plenum. The plenum below the bottom tubesheet may or may not be provided with built-in walkways, depending upon the preference of the designer of the baghouse. Observations into the interior of the bag filters may be made from the top and bottom plenums.

Continuing with FIG. 1, the upper or top plenum 20 is shown above top tubesheet 14, central filter plenum 22 between top tubesheet 14 and bottom tubesheet 16, and the lower or bottom plenum 24 below bottom tubesheet 16. The lowermost portion of each compartment is designated as the hopper portion, numeral 26, the hopper receiving the filter cake as well as the settled out particulates brought in by the flue exhaust. The particulates collected in hopper 26 of each compartment are dumped through a valve (not shown) for eventual disposal.

Continuing with FIG. 1, compartment 10 is shown during its cleaning mode procedures. As mentioned earlier, anti-collapse circumferential rings are sewn into the bag filters at spaced apart locations and the presence of those rings is reflected in the drawing of bag filter 18. Compartment 12, however, is shown operating on-line in the process of filtering particulates from the flue exhaust received from the power plant boiler or other process (not shown).

Inlet header 28 is the duct interiorly to the baghouse which carries the flue exhaust (with the suspended particulates) received from the boiler through flue exhaust duct 32. Inlet flange 30 is situated at the mating of inlet header 28 and the flue exhaust duct 32. Inlet header 28, which runs the entire length of the baghouse, is connected to each compartment by means of connecting ducting. Each connecting duct contains a damper, such as inlet damper 34 in connecting inlet duct 35 joining the top of compartment 10 to inlet header 28. Similarly, inlet damper 36 is located in connecting inlet duct 37 joining the top of compartment 12 to header 28.

Continuing, clean exhaust duct 46 carries the gases of the flue exhaust after the particulates have been removed. This line connects to the filter plenum of each compartment by means of connecting outlet ducts. Each connecting outlet duct is also interrupted by an outlet damper. For example, connecting outlet duct 47 with contained outlet damper 48 is shown situated between clean exhaust duct 46 and filter plenum 22 of compartment 10. Similarly, filter plenum 22 of compartment 12 communicates with clean exhaust duct 46 by means of connecting outlet duct 49, connecting duct 49 interrupted by outlet damper 50. Clean exhaust duct 46 connects as an inlet to induced draft fan 52 whose outlet sends the clean exhaust gases on to smokestack or chimney 54.

At the bottom of FIG. 1 is shown the reverse air duct 38 operably connected to bottom plenum 24 of each compartment by means of connecting ducting, this connecting ducting also interrupted by dampers. More specifically, reverse air damper 40 is in line with connecting duct 41 between bottom plenum 24 of compartment 10 and reverse air duct 38 while reverse air damper 42 is interposed connecting duct 43 between bottom plenum 24 of compartment 12 and reverse air duct 38. Reverse air duct 38 is connected as an intake to reverse air fan 44, the output of fan 44 directed by duct 45 to flue exhaust duct 32 at a point prior to its joinder to inlet header 28 at inlet flange 30. When reverse air damper 40 is open during the cleaning operation, dirty gases are sent back into the flue exhaust system for cleaning by other on-line compartments.

As mentioned earlier, conventional top inlet baghouse 8 shown in FIG. 1 illustrates compartment 10 while in the cleaning mode and compartment 12 in the on-line mode filtering particulates out of the flue exhaust from the boiler. During the on-line operation, the flue exhaust with suspended particulates moves along inlet header 28, into connecting inlet duct 37 through open inlet damper 36, and into upper plenum 20 of compartment 12. There it proceeds downward through the interior of elongated cylindrical bag filter 18, flowing out through the sides of bag filter 18 as shown by arrow 19, the bag filter collecting particulates while allowing clean exhaust gases to pass into the filter plenum 22 surrounding all of the bag filters. These clean exhaust gases pass into connecting outlet duct 49, through open outlet damper 50 and into clean exhaust duct 46 where it is drawn to smokestack 54 by means of induced draft fan 52. Reverse air damper 42 in line of connecting duct 43 shown to the bottom left of compartment 12 is closed so that no flue exhaust present in lower plenum 24 is conveyed through connecting duct 43 to reverse air duct 38. On-line compartment 12 generally operates in its filtering mode for a period of time in the range of 30 to 400 minutes before it commences the cleaning mode. Typical examples of pressures existing in the system are as follows: flue exhaust duct 32 and inlet header 28, $-15$ inches of water; drop across bag filter 18, $-3$ to $-8$ inches of water; induced draft fan 52 inlet $-21$ inches of water; at base of smokestack 54, $\pm 1$ inch of water; and reverse air discharge at fan 44, $-12$ inches of water. These pressures are in inches of water column gauge and vary a great deal with the application. In some applications these pressures are positive.

Compartment 10 is in its cleaning mode and in such case, inlet damper 34 situated in inlet connecting inlet duct 35 between the top of compartment 10 and the inlet header 28 is closed. This shuts off flue exhaust from entering compartment 10. Outlet damper 48 situated in connecting outlet duct 47 between clean exhaust duct 46 and filter plenum 22 remains open; however, the direction of movement of the clean exhaust gases is reversed, the clean exhaust gases in duct 46 now enters plenum 22 of compartment 10. This is possible because as will be shown, the clean exhaust gas which enters is pulled out of lower plenum 24 of compartment 10. Connecting lower plenum 24 of compartment 10 to the reverse air duct 38 is connecting duct 41, intermediate reverse air damper 40 now being open. Clean exhaust gases from duct 46 enter compartment 10 because they are at a pressure greater than the pressure in plenum 24 which reflects the pressure in reverse air duct 38. As the exhaust gases enter plenum 22, they cause bag filter 18 to deform about the anti-collapse circumferential rings, taking the shape shown in compartment 10. This causes the built-up cake to break off from the inside walls of bag filter 18 and fall to the bottom hopper portion 26 of compartment 10. In addition, the passage of the clean exhaust gases through bag filter 18 as shown by arrow 17 helps to transport particulate matter situated on the interior walls of bag filter 18. The airborne particulate matter interiorly to bag filter 18 and plenum 24 is carried to reverse air duct 38 through connecting duct 41. This dirty gas is circulated through reverse air fan 44 and through duct 45 back into the flue exhaust ducting 32, joining flue exhaust ducting 32 just prior to inlet flange 30. The cake which collects in hopper 26 of compartment 10 is dumped by a valve (not shown) into means for carrying the particulates away for disposal.

The cleaning mode described will usually operate in a compartment for a period of time ranging between 2 and 4 minutes. At the completion of the cleaning mode, the compartment returns to the on-line filtering mode as another compartment enters into the cleaning mode. In a baghouse, the on-line/cleaning mode operations are continuously repeated at a frequency necessary to achieve an acceptable overall pressure loss.

It is noted that with the conventional baghouse construction shown in FIG. 1, floaters are not completely purged from compartment 10 as no means are provided to remove those floaters from the interior of the bag filters 18 and the upper plenum 20. As a consequence, when compartment 10 comes back on line, these submicrometer floaters are the first particulates to engage bag filter 18 and thus coat the inside surface of bag filter 18 with particles which substantially raise the operational pressure drop across the bag.

Figure 2:
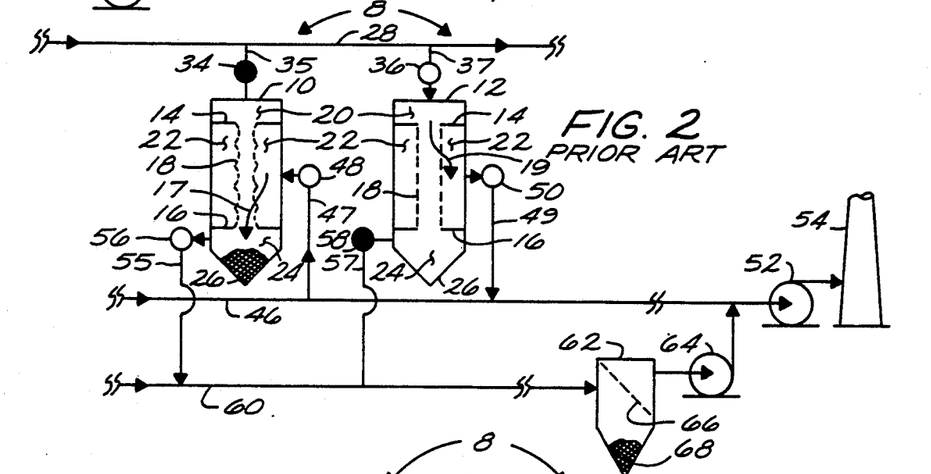
FIG. 2 is the schematic block diagram of the prior art top inlet baghouse construction including an independent reverse air system.

Referring now to FIG. 2, a conventional top inlet baghouse 8 is also shown wherein a second type of cleaning system is depicted, an independent reverse air system utilizing a pulse jet baghouse to receive the particulates from the compartment being cleaned. Here, during the cleaning mode, such as shown in compartment 10 of FIG. 2, the airborne particulates are drawn from bottom plenum 24 through connecting duct 55 into independent reverse air duct 60. Independent reverse air damper 56 in-line with connecting duct 55 is open during the cleaning mode. Compartment 12, which is presently on-line accomplishing its filtering operation, has its independent reverse air damper 58 closed, damper 58 being in connecting duct 57 communicating lower plenum 24 with independent reverse air duct 60. Independent reverse air duct 60 is directed to the inlet side of pulse jet baghouse 62 which has its own contained filter 66 together with particulate hopper 68. Particulates which were removed from compartment 10 are collected by filter 66 as the gases are drawn through pulse jet baghouse 62 by independent reverse air fan 64, the output of which is then directed to the input of induced air fan 52. The output of induced air fan 52 then leads to smokestack 54.

As can be seen, the substantial differences between the prior art shown in FIGS. 1 and 2 is the method by which the airborne particulate laden gases present during the cleaning mode are filtered for removal of the particulates. In FIG. 1, the airborne particulates are recirculated through the filtering process itself, entering the top of the remaining on-line compartments. In FIG. 2, the airborne particulates are sent to a separate pulse jet baghouse for filtering with the resultant clean gases then moved on to the smokestack.

Figure 3:
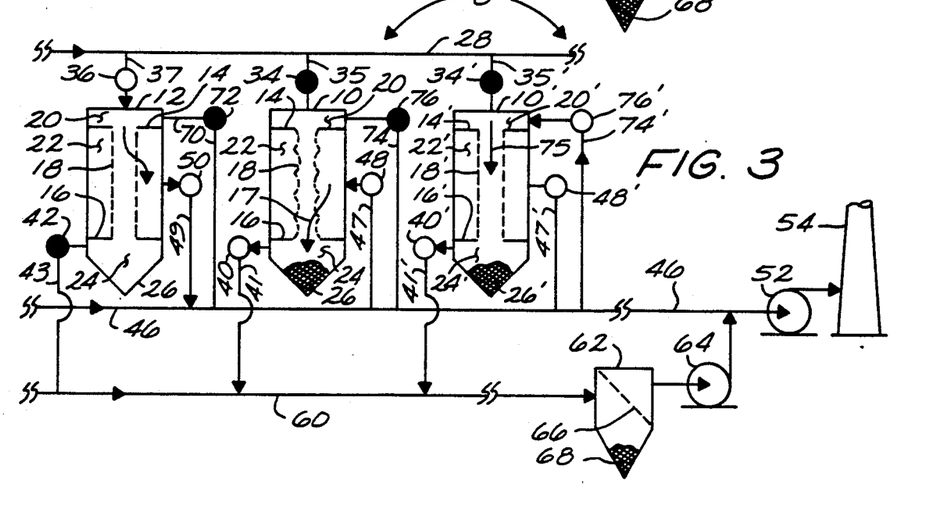
FIG. 3 is a schematic block diagram showing the invention implemented into a top inlet baghouse construction.

The subject invention is shown in FIG. 3 wherein modifications have been made to baghouse construction 8. Shown for illustrative purposes are a portion of the plurality of compartments of a baghouse. For ease of illustration, compartment 10 is repeated in FIG. 3, compartment 10 in the first step of a now 2 step cleaning mode and compartment 10' in the second step of the 2 step cleaning mode.

As was the case in the prior art depicted in FIGS. 1 and 2, compartment 12 of FIG. 3 shows the operation of a compartment in its on-line mode. Compartment 10 in its first step of a new cleaning mode has terminated the flue exhaust from inlet header 28 from entering the compartment by closing inlet damper 34. In addition, outlet damper 40 remains open thereby allowing clean exhaust gases to enter filter plenum 22 for purposes of deforming the bag filter to cause cake to break up and fall off and settle in lower hopper 26 of compartment 10.

In the invention, the cleaning mode, rather than being one operation over a single time period now comprises two separate operations during that time period although, depending upon results desired, the cleaning mode time period for each step of this two step operation may be varied.

The invention provides for the addition of a connecting purging duct between clean exhaust duct 46 and top plenum 20 of each compartment in the baghouse. In each connecting purge duct, a purge damper is inserted. More specifically, connecting to the top of compartment 12 so as to be in open communication with upper plenum 20 is connecting purge duct 70, connecting duct 70 extending to clean exhaust duct 46. Purge damper 72 is placed in the line of connecting duct 70. Similarly, connecting purge duct 74 places the upper plenum 20 of compartment 10 into communication with clean exhaust duct 46, purge damper 76 also situated in the connecting duct. Lastly, connecting purge duct 74' is shown communicating with plenum 20' of compartment 10', connecting duct 74' also connected to clean exhaust duct 46. Here again, purge damper 76' is placed in line of the connecting duct 74'.

In the first step of the two step cleaning operation, compartment 10 is cleaned in its normal fashion as was described in relationship to FIG. 2 wherein clean exhaust gases from clean exhaust duct 46 are introduced into the filter plenum 22 of compartment 10 via connecting outlet duct 47 through open outlet damper 48. Step 1 occurs when inlet damper 34 is closed and reverse air damper 40 opens.

The second step of the cleaning operation, which occurs sequentially after the first step illustrated in compartment 10 is shown in FIGS. 2 and 3, is shown in compartment 10' of FIG. 3. It is intended that by the illustration in FIG. 3, compartment 10' is representative of compartment 10 in the second step of its cleaning mode and not a third separate compartment. It is anticipated that only one compartment of the plurality of compartments in a baghouse will go through a complete cleaning operation at a time and only after that compartment is completed, will another compartment then enter into its cleaning cycle. By this means, only one compartment at a time is off-line for cleaning.

In the second step of the cleaning operation shown in compartment 10', i.e., the final purge, purge damper 76' opens to permit clean exhaust gases from clean exhaust duct 46 to enter the upper plenum 20'. At such time the path of least resistance for the flow of clean gas will be downward through the interior of bag filter 18' as shown by arrow 75 in preference to flow from filter plenum 22' through the bag filter 18' which will have a greater resistance to flow. Damper 48' remains open as it does both on line and during both parts of the cleaning cycle but, as FIG. 3 shows, there is no flow in duct 47' during the second step. The clean exhaust gases moving centrally downward through bag filter 18' will return the bag filter to a cylindrical shape and will sweep into lower plenum 24' and out connecting duct 41' through open reverse air damper 40' to independent reverse air duct 60. With the clean exhaust gases entering upper plenum 20', passing through the center of bag filter 18' into lower plenum 24', and out connecting duct 41', floaters situated in upper plenum 20' and the interior of bag filter 18' are carried out. The remainder of the operation is similarly as described in connection with FIG. 2, namely the floaters in independent reverse air duct 60 now go into the pulse jet baghouse 62 where they are filtered out before final discharge from smokestack 54.

Thus by means of introducing clean exhaust gases into the upper plenum of a top inlet type compartment, substantially all floaters have been removed and the compartment has been thoroughly cleaned so that floaters which remained after the prior art style of cleaning do not initially form filter cake on the bag filters as soon as the compartment goes back into on-line operation.

Figure 4:
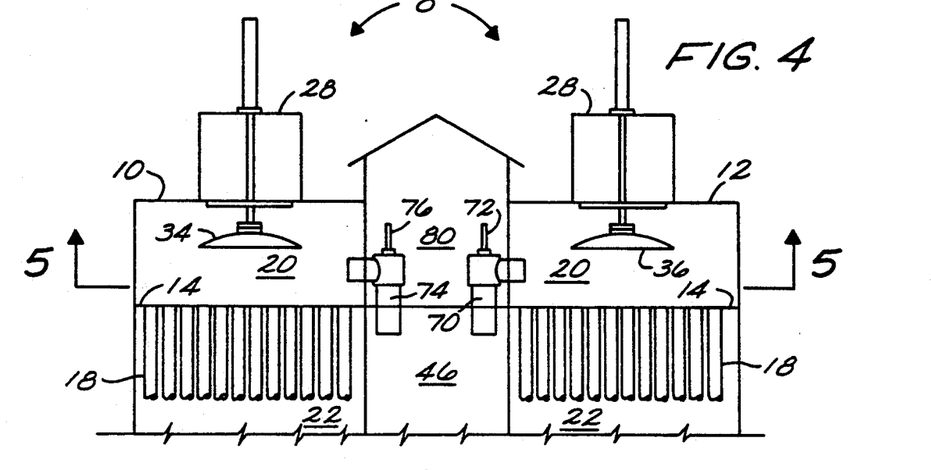
FIG. 4 is a partial end sectional view of a top inlet baghouse construction showing the invention.
Figure 5:
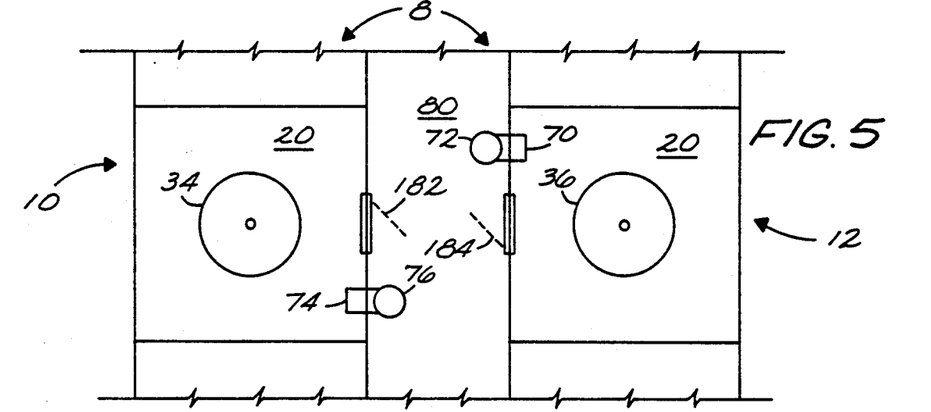
FIG. 5 is a partial top sectional view of a top inlet baghouse construction showing the invention.

FIGS. 4 and 5 are partial views of a typical top inlet baghouse with the invention installed to show the simplicity with which top inlet baghouses may be modified to accommodate the invention.

Referring firstly to FIG. 4, a partial sectional end view is shown of top inlet baghouse 8 with the invention in place operating upon compartments 10 and 12. Situated on top of each compartment is inlet header 28 which delivers the flue exhaust to all compartments. Typical baghouse construction provides for an arrangement of compartments similarly as shown in FIG. 4 in that two parallel rows of compartments are arranged to share as many common facilities as possible. Selectively interrupting the flue exhaust entering compartment 10 is inlet damper 34 with inlet damper 36 operably attached to compartment 12. The large round plate valve of each damper is controlled by an electrically or hydraulically operated connected positioners as shown in the figure. The flue exhaust gases enter upper plenum 20 of each compartment to pass into bag filters 18, of which a few are shown of the many located in the compartment. At the top of bag filters 18 is the tubesheet 14. Centrally located is the passageway or walkway 80 through which personnel move for access into each compartment, the floor of passageway 80 generally on the same level as the tubesheet in each compartment. Immediately below passageway 80 is the clean exhaust duct 46 which runs the length of the baghouse and which receives cleaned gases from all the filter plenum 22. Communicating upper plenum 20 of compartment 10 with clean exhaust duct 46 is connecting purge duct 74 with purge damper 76 situated in the line. On the opposite side, connecting purge duct 70 together with purge damper 72 is shown communicating clean exhaust duct 46 with upper plenum 20 of compartment 12. Here again, both purge dampers 72 and 76 are hydraulically or electrically operated mechanical dampers which close off or open up flow of clean exhaust gases through their connecting ducts into upper plenum 20 of respective compartments, thus allowing for full and complete removal of floaters in the second step of the operation.

FIG. 5 is a sectional view taken through section line 5—5 of baghouse 8 in FIG. 4. This is a view looking up in upper plenum 20 of each compartment and of passageway 80. Shown in FIG. 5 is each of the compartments 10 and 12, their upper plenum 20, and centrally located in each compartment, the round circular sealing plate of purge dampers 34 and 36. In centrally located passageway 80 is seen the addition of the invention, namely connecting purge duct 74 with associated purge damper 76 adapted to permit entrance of clean exhaust gases into the upper plenum 20 of compartment 10. On the other side, connecting purge duct 70 is shown communicating with the upper plenum 20 of compartment 12, the connecting duct having its associated purge damper 72 attached thereto. Lastly shown in FIG. 5 are doors 182 and 184 which allow entrance into the upper compartments by worker personnel for inspection and repair.

Now while the invention has been described in connection with top inlet baghouse construction, it is apparent that the same principles embodied in the subject invention may also be applied to the more commonly found bottom inlet baghouses with the addition of a few modifications. For a background of a typical bottom inlet baghouse construction, reference is made to FIG. 6 where is shown in symmetric block diagram form bottom inlet baghouse 91. Firstly are detailed compartments 82 and 84, compartment 82 in the process of being cleaned (as will be discussed later) while compartment 84 is in operation on-line. In each compartment is situated bag filter 86, the filter secured at its bottom at lower tubesheet 88 which, incidentally, is the only tubesheet in the compartment. Consequently, only two plenums exist in a bottom inlet compartment, the filter plenum above the tubesheet and the lower plenum below the tubesheet extending into bottom hopper 81 and 83 (compartments 82 and 84 respectively). Gaining entrance into the lower plenum 90 of each compartment is connecting inlet duct 92 for compartment 82 and connecting inlet duct 94 for compartment 84. Disposed in each of the respective connecting inlet ducts 92 and 94 are inlet dampers 96 and 98 respectively. Both connecting inlet ducts 92 and 94 are in communication with inlet header 100 which brings the flue exhaust from the boiler or process (not shown) to be distributed to each of the compartments.

Figure 6:
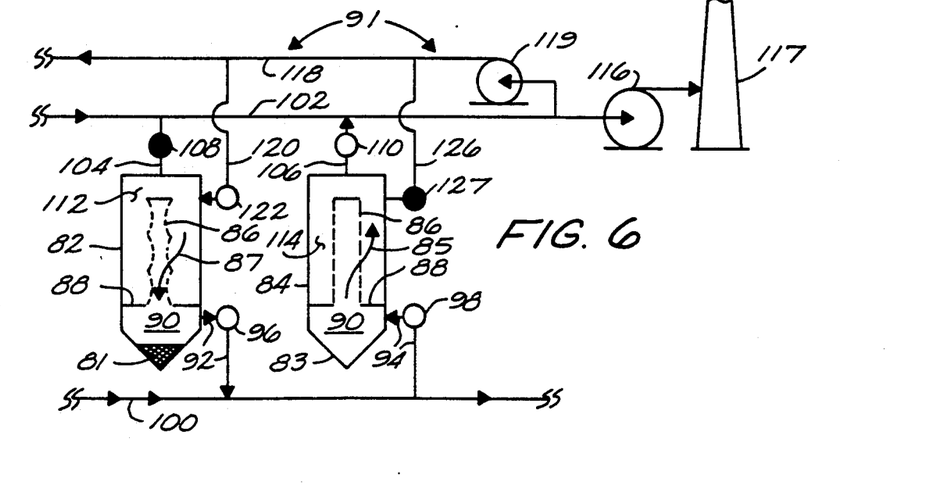
FIG. 6 is a schematic block diagram of the prior art bottom inlet baghouse construction.

Shown immediately above the compartments is the clean exhaust duct 102 which receives the cleaned gases from the flue exhaust after the particulates have been filtered out by bag filters, the gases moving through connecting outlet duct 104 (compartment 82) and connecting outlet duct 106 (compartment 84). Disposed in each connecting outlet duct is a respective outlet damper, outlet damper 108 situated in connecting outlet duct 104 and outlet damper 110 in connecting outlet duct 106. Each of the connecting outlet ducts 104 and 106 attach to their respective compartments in the upper portion of the filter plenums, filter plenum 112 situated around bag filter 86 in compartment 82 and filter plenum 114 situated around bag filter 86 in compartment 84. Clean exhaust duct 102 conveys clean gases to induced draft fan 116 and onto smokestack or chimney 117.

Lastly shown in FIG. 6 is the means by which the bag filters in each compartment are typically cleaned wherein gas from the "reverse air" duct 118 is directed into the filter plenum of each compartment. Cleaned gases in reverse air duct 118 are obtained from clean exhaust duct 102 by means of reverse air fan 119. Clean gases from reverse air duct 118 enter compartment 82 by means of connecting duct 120 through open cleaning damper 122 while clean gases enter compartment 84 by means of connecting duct 126, passing through cleaning damper 127 if open.

In the on-line operation shown in compartment 84, flue exhaust is received from inlet header 100 through connecting inlet duct 94 and open inlet damper 98 into lower plenum 90. The gases rise upwardly into bag filter 86 and pass horizontally through the vertical sides of the bag filter as shown by arrow 85, leaving behind the particulates in the flue exhaust to form a cake on the interior of the bag filter. The clean exhaust gases which fill filter plenum 114 of compartment 84 are removed at the top of compartment 84 through connecting outlet duct 106 and open outlet damper 110 to clean exhaust duct 102. Cleaning damper 127 situated in connecting cleaning line 126 between the top portion of compartment 84 and the reverse air duct 118 is closed so that clean gases from reverse air duct 118 may not enter the compartment.

The cleaning mode operation is shown in compartment 82 where the outlet damper 108 is closed so that no gases pass from filter plenum 112 into clean exhaust duct 102. However, at or about the same time, cleaning damper 122 is opened which permits clean gases from reverse air duct 118 to enter into plenum 112 of compartment 82 through connecting cleaning duct 120 and open cleaning damper 122. These gases, being at a higher pressure because of reverse air fan 119, cause the bag filter 86 to deform about the anti-collapse circumferencial rings, the bag filter taking the shape generally shown in compartment 82. The cake then breaks up and falls down through bag filter 86 to be collected in bottom hopper 81. The reverse air gases entering compartment 82 remove particulate matter from the bag filters and carries some airborne particulates through connecting inlet duct 92 and open inlet damper 96 into the inlet header 100 where the gas and some airborne particulates pass on to the on-line compartments.

Two means for the application of the invention to the bottom inlet baghouse construction are shown in FIGS. 7-11.

Figure 7:
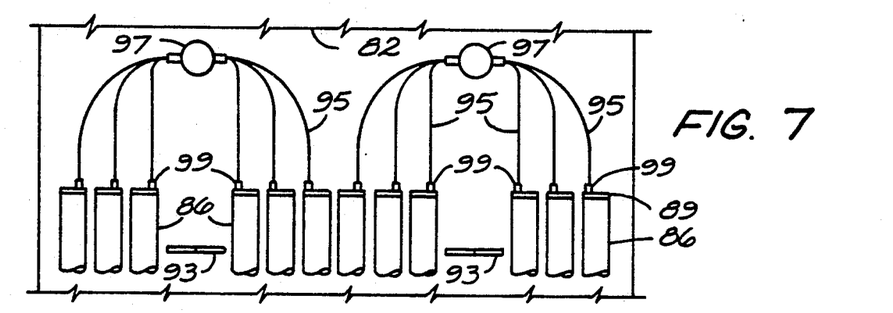
FIG. 7 is a partial side sectional view of a bottom inlet baghouse construction showing the invention in place.

FIGS. 7 and 8 are partial sectional views of a compartment in a bottom inlet baghouse construction showing the invention in place. More specifically, shown in FIG. 7 interiorly to the compartment 82 is bag filter 86 which is operably attached at its upper end to bag filter metal cap 89, metal cap 89 being suspended from the ceiling of the compartment with a spring mechanism (not shown). As can be seen, there are a plurality of bag filters 86 in the compartment and for illustrative purposes, walkways 93 are also shown.

Figure 8:
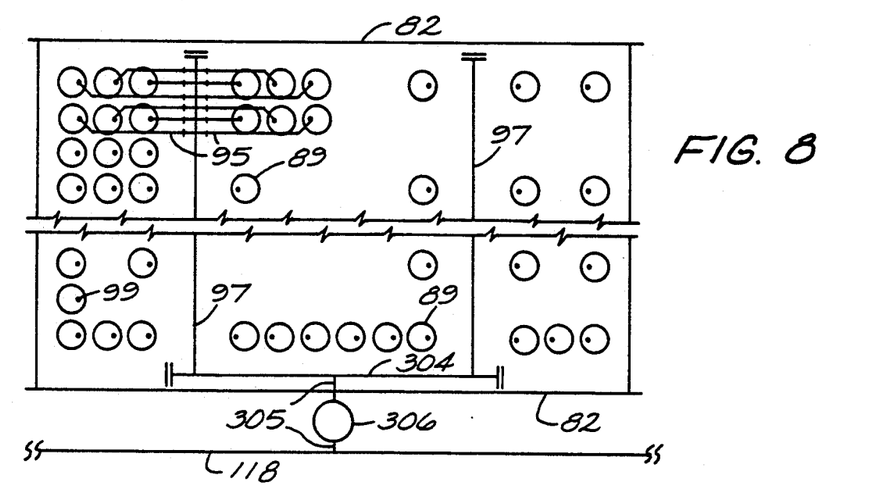
FIG. 8 is a partial top sectional view of a bottom inlet baghouse construction showing the invention in place.

The invention is a means to supply clean gas to the tops of bag filters 86 to cause a down flow of gas in the bag filters 86 adequate to purge floaters from the bag filters 86. The addition of nozzles 99 to the bag caps 89 provides entry for clean gas to the tops of the bag filters 86. Connecting the bag cap nozzles 99 to manifolds 97 by means of flexible tubing 95 enables each manifold 97 to supply clean gas to bag filters 86 in a typical 3-bag reach arrangement as shown in FIGS. 7 and 8. The manifolds 97 in turn are connected to a compartment header 304 that serves all of the manifolds 97 in that compartment.

The compartment header 304 is then connected by duct 305 to the reverse air duct 118 shown in FIG. 6 as shown in FIG. 8. Duct 305 includes purge damper 306 which is opened during the second step of a two step cleaning cycle to purge the floaters from the interior of all the bag filters 86 in the compartment 82. Duct 305, flexible tubing 95, and manifold 97 constitute the purging duct.

Figure 9:
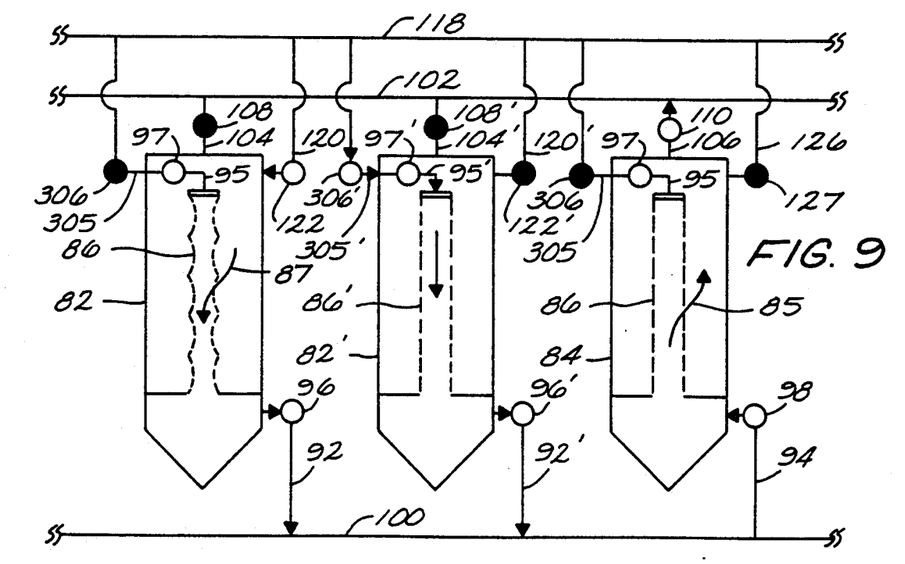
FIG. 9 is a schematic block diagram showing the invention in place in a bottom inlet baghouse construction during cleaning mode.

This means for purging floaters from bottom inlet bags is shown in schematic block diagram form in FIG. 9 where compartment 82 is in the conventional bottom inlet cleaning mode and where compartment 82' is the new second step of that cleaning method using the new floater purge system shown in FIGS. 7 and 8.

By means of the configuration shown in FIGS. 7, 8, and 9 clean reverse air from reverse air duct 118 is introduced into the very top interior region of bag filters 86 through ducts 305 and purge damper 306 so that floaters that remained interiorly to the bag filter after the first step of normal cleaning, especially in the upper regions, are purged from the bag filters during the second step through the bottom plenum and back into the flue exhaust inlet header 100 shown in FIG. 9 (and FIG. 6).

Figure 10:
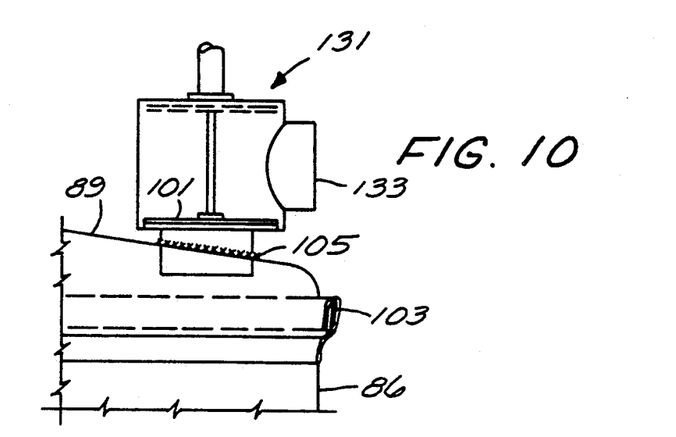
FIG. 10 is a partial side sectional view of a second embodiment of the invention in place atop a bag filter in a bottom inlet baghouse compartment.
Figure 11:
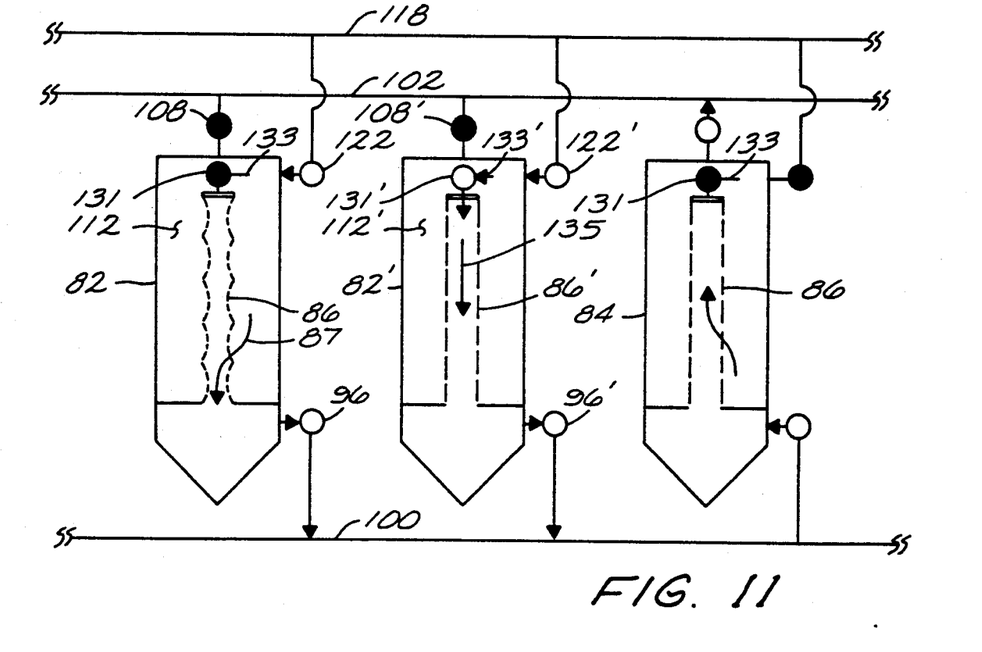
FIG. 11 is a schematic block diagram showing the second embodiment of the invention in place in a bottom inlet baghouse construction during cleaning mode.

Another means to accomplish floater purge in bottom inlet baghouses is shown in FIGS. 10 and 11.

FIG. 10 is a partial cross sectional view of purge damper 131 operably attached to metal cap 89 by welding bead 105. Purge damper 131 works as conventional dampers in the invention do, being either an electrically or hydraulically actuated positioner attached to round circular plate 101 alternately covering or opening the passageway through the metal cap 89, covering for no gas flow and being raised to allow gas flow through the damper. Also shown in FIG. 10 is the circumferential band 103 which secures bag 86 to the rim of metal cap 89.

In FIG. 10, nozzle or purge duct 133 is open to filter plenum 112 as shown in FIGS. 6 and 11. In the conventional single step cleaning procedure that is common for bottom inlet baghouses, clean exhaust damper 108 and the reverse air damper 122 of FIG. 6 are both closed at the end of the cleaning cycle and just prior to returning the compartment to service. At that time there is no flow through the bag filters 86 in either direction and flow as shown by arrow 87 does not exist.

With the means provided by the dampers 131 shown in FIG. 10 the single step procedure can be changed to the two step procedure described for top inlet bag filters.

This can be accomplished with the reverse air damper 122 and the inlet damper 96 both open and with the clean exhaust damper 108 closed. After the reverse air damper 122 has been open for 30 to 60 seconds the first step will be complete. Leaving the reverse air damper 122 open and then opening all of the floater purge dampers 131', one on each bag filter 86', the path of least resistance for the reverse gas flow will be into the purge dampers 131' through the open ports 133' and down through bag filter 86' as shown by arrow 135 in compartment 82' in FIG. 11.

While the invention has been described, disclosed, illustrated and shown in certain terms or certain embodiments or modifications which it has assumed in practice, the scope of the invention is not intended to be nor should it be deemed to be limited thereby, and such other modifications or embodiments as may be suggested by the teachings herein are particularly reserved especially as they fall within the breadth and the scope of the claims here appended.

I claim:

1. A method to purge floaters from compartments in a top inlet baghouse construction, said compartments having an upper plenum and said baghouse construction having a clean exhaust duct, said clean exhaust duct communicating with said upper plenum, the method to purge floaters following a cleaning cycle, the method comprising the step of:

introducing clean exhaust gases into each of said compartments at a selected point, said clean exhaust gases conveying away the floaters from each of said compartments.

2. The method of purging floaters from compartments in a top inlet baghouse construction as defined in claim 1, wherein said step of introducing clean exhaust gases into each of said compartments at a selected point includes the step of introducing clean exhaust gases into the upper plenum of each compartment whereby the floaters are conveyed out of each of the compartments by the clean exhaust gases.

3. The method of purging floaters from compartments in a top inlet baghouse construction as defined in claim 2 further including the step of introducing clean exhaust gases into the upper plenum of each of the compartments following the compartment cleaning cycle.

4. The method of purging floaters from compartments in a top inlet baghouse construction as defined in claim 3, further including the step of conveying the clean exhaust gases from the clean exhaust duct to the upper plenum of each of the compartments.

5. The method for purging floaters from compartments in a top inlet baghouse construction as defined in claim 4 further including the step of selectively controlling the flow of clean exhaust gases into the upper plenum.

6. The method of purging floaters from compartments in a top inlet baghouse construction as defined in claim 5 further including the step of utilizing a controllable damper to selectively control introduction of clean exhaust gases into the upper plenum of each of the compartments.

7. A method to purge floaters from compartments in a bottom inlet baghouse construction, the compartments containing bag filters and operating through a cleaning cycle, the method comprising the step of:

introducing reverse air into each of the bag filters of each of said compartments whereby the floaters in the bag filters are conveyed out of the bag filters by the reverse air.

8. The method of purging floaters from bag filters of compartments as defined in claim 7 wherein the step of introducing reverse air into each of the bag filters further includes the step of introducing reverse air into each of the bag filters of each of the compartments following the compartment cleaning cycle.

9. The method of purging floaters from bag filters of compartments of bottom inlet baghouse construction as defined in claim 8 further including the step of selectively controlling the flow of reverse air into each of the bag filters.

10. The method of purging floaters from compartments in a bottom inlet baghouse construction as defined in claim 9 wherein the step of selectively controlling the flow of reverse air into each of the bag filters includes the step of utilizing a controllable damper to selectively control introduction of reverse air.

11. An improvement to purge floaters in a top inlet baghouse construction having a plurality of compartments, each of said compartments having a spaced apart upper tubesheet and lower tubesheet therein, an upper plenum formed above said upper tubesheet,
a lower plenum formed below said lower tubesheet, and
a filter plenum formed between said upper and lower tubesheet, and a hopper below said lower tubesheet and said lower plenum,
each said upper tubesheet and lower tubesheet having a plurality of openings therethrough, and a plurality of elongated bag filters having cylindrical sides and an interior, said bag filters operably attached to said upper and lower tubesheet proximate said plurality of openings, said baghouse further including an inlet header carrying flue exhaust laden with particulates to be filtered through the sides of said bag filters, said inlet header operably connected to each of said compartments by an inlet duct communicating with said upper plenum, said inlet duct having a controllable inlet damper therein, a clean exhaust gases duct carrying filtered flue exhaust to a smokestack, said clean exhaust duct operably connected to each of said compartments by an outlet duct communicating with said filter plenum, said outlet duct having a controllable outlet damper therein; and a reverse air duct operably connected to each of said compartments by a cleaning outlet duct communicating with said bottom plenum, said cleaning outlet duct having a controllable cleaning damper therein, said controllable cleaning damper permitting clean exhaust gases to flow into said filter plenum through said outlet duct, through said bag filters in a reverse direction, and into said bottom plenum and out said cleaning outlet duct when each of said compartments are in their respective cleaning cycle, the improvement to purge floaters comprising:

means to introduce clean exhaust gases into each of said compartments to purge floaters remaining in each of said compartments at the termination of their respective cleaning cycle, said means permitting conveying away of the floaters from each of said compartments to the reverse air duct.

12. The improvement to purge floaters in a top inlet baghouse construction as defined in claim 11 wherein said means to introduce clean exhaust gases into each of the compartments includes purge ducts operably connected to said upper plenum of each of said compartments and to said clean exhaust duct, said purge ducts permitting the flow of clean exhaust gases into said upper plenum to sweep floaters from said upper plenum through said interior of said cylindrical bag filters to said bottom plenum, and out said cleaning outlet duct to said reverse air duct whereby floaters are purged from the upper plenum of said compartments following the cleaning cycle.

13. The improvement to purge floaters in a top inlet baghouse construction as defined in claim 12 further including controllable purge dampers, said controllable purge dampers operably connected to said purge ducts, said purge dampers operating to permit the entrance of clean exhaust gases into the upper plenum when floaters are to be purged from the upper plenum of each of said compartments.

14. The improvement to purge floaters in a top inlet baghouse construction as defined in claim 13 wherein said controllable purge dampers are situated within said purge ducts whereby said purge dampers are controlled to permit the flow of clean exhaust gases in the purge ducts to effect the floater purge.

15. An improvement to purge floaters in a bottom inlet baghouse construction with compartments each having a lower tubesheet, a filter plenum formed above said lower tubesheet, a lower plenum formed below said lower tubesheet, and a hopper below said lower tubesheet and said lower plenum, said lower tubesheet having a plurality of openings therethrough, and a plurality of elongated bag filters having cylindrical sides, said bag filters operably attached to said lower tubesheet proximate said plurality of openings, said baghouse further including an inlet header carrying flue exhaust laden with particulates to be filtered through the sides of said bag filters, said inlet header operably connected to each of said compartments by an inlet duct communicating with said bottom plenum, said inlet duct having a controllable inlet damper therein, a clean exhaust gases duct carrying filtered flue exhaust gases to a smokestack, said clean exhaust gases duct operably connected to each of said compartments by an outlet duct communicating with said filter plenum, said outlet duct having a controllable outlet damper therein; and a reverse air duct operably connected to each of said compartments by a cleaning inlet duct communicating with said filter plenum, said cleaning inlet duct having a controllable cleaning damper therein, said controllable cleaning damper permitting reverse air to flow into said filter plenum through said cleaning inlet duct and through said sides of said bag filters in a reverse direction, into said bottom plenum and out said inlet duct to said inlet header when each of the compartments are in their respective cleaning cycle, the improvement to purge floaters comprising:

means to introduce clean exhaust gases into each of said bag filters of each of the compartments to purge floaters remaining in the bag filters at the termination of the cleaning cycle, said means permitting conveying away of the floaters from each of the bag filters and into the inlet header.

16. The improvement to purge floaters in a bottom inlet baghouse construction as defined in claim 15 wherein said means to introduce reverse air into each of said bag filters of each of said compartments includes purge ducts operably connected to said bag filters and to said reverse air duct, said purge ducts permitting the flow of reverse air into said bag filters to sweep floaters from said bag filters into said bottom plenum and out through said inlet duct to said inlet header.

17. The improvement to purge floaters in a bottom inlet baghouse construction as defined in claim 16 further including controllable purge dampers operably connected to said purge ducts, said controllable purge dampers operating to permit the entrance of reverse air into each of said bag filters when floaters are to be purged from said bag filters.

18. The improvement to purge floaters in a bottom inlet baghouse construction as defined in claim 17 wherein said controllable purge dampers are located within said purge ducts whereby said purge dampers are controlled to permit the flow of reverse air into the purge ducts to effect the floater purge.

19. The improvement to purge floaters in a bottom inlet baghouse construction as defined in claim 15 wherein said means to introduce clean exhaust gases into each of the bag filters of each of said compartments include purge ducts operably connected to each of the bag filters, said purge ducts communicating with said filter plenum, said purge ducts permitting the flow of reverse air in said filter plenum to enter said bag filters to sweep floaters from said bag filters into said bottom plenum and out said inlet duct to said inlet header.

20. The improvement to purge floaters in a bottom inlet baghouse construction as defined in claim 19 further including controllable purge dampers, said controllable purge dampers operably connected to said purge ducts, said purge dampers operating to permit the entrance of reverse air into said purge ducts operably connected to said bag filters when floaters are to be purged from the bag filters.

21. The improvement to purge floaters in a bottom inlet baghouse construction as defined in claim 20 wherein said controllable purge dampers are located within said purge ducts whereby said purge damper is controlled to permit the flow of reverse air in the purge duct to effect the floater purge.

* * * * *